Figure 4:
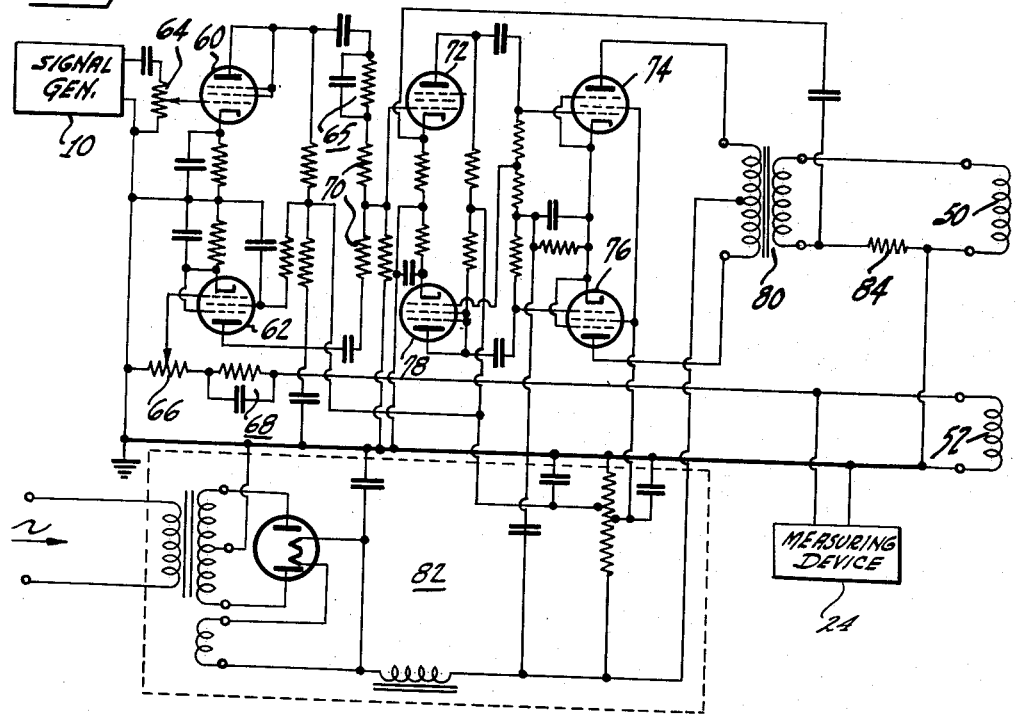

March 2, 1954
J. G. WOODWARD
2,671,135
PHONOGRAPH PICKUP TEST INSTRUMENT
Filed Aug. 5, 1950
2 Sheets-Sheet 1
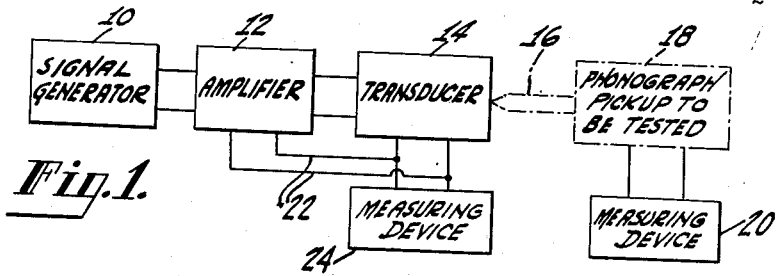
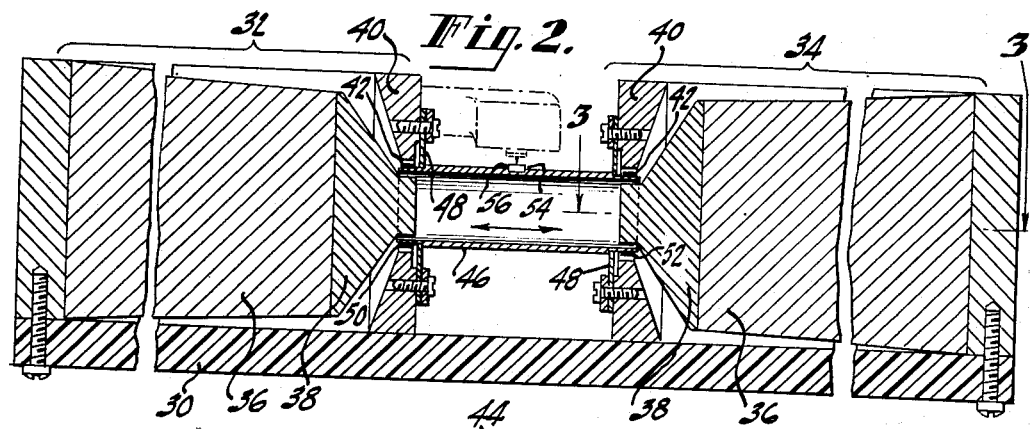
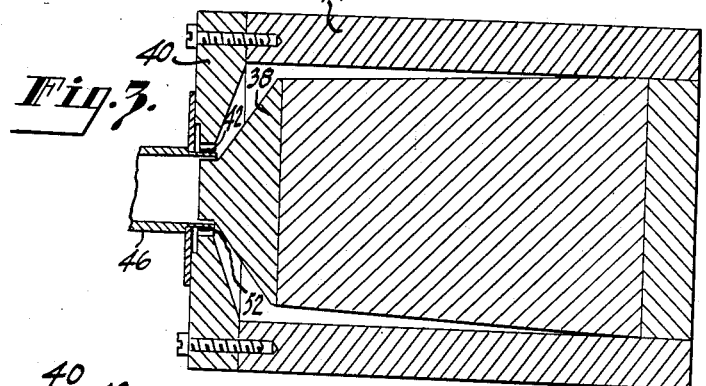
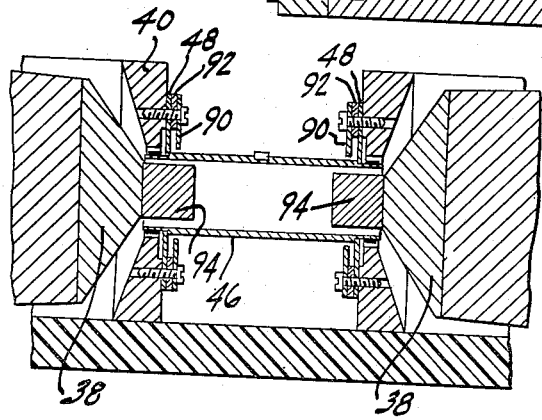
INVENTOR
J. GUY WOODWARD
BY
ATTORNEY March 2, 1954

J G. WOODWARD 2,671,135

PHONOGRAPH PICKUP TEST INSTRUMENT

Filed Aug. 5, 1950

2 Sheets-Sheet 2

INVENTOR
J. GUY WOODWARD
BY
ATTORNEY

Patented Mar. 2, 1954

2,671,135

UNITED STATES PATENT OFFICE 2,671,135

PHONOGRAPH PICKUP TEST INSTRUMENT

J Guy Woodward, Princeton, N. J., assignor to Radio Corporation of America, a corporation of Delaware Application August 5, 1950, Serial No. 177,861

15 Claims. (Cl. 179—175.1)

This invention relates to improvements in phonograph pickup testing and measuring apparatus, and particularly to an improved apparatus for measuring the various operating characteristics of an electric phonograph pickup.

As is well known, an electric phonograph pickup comprises an electromechanical transducer including a needle or stylus adapted to ride in the grooves of a phonograph record. Variations in the grooves of the record cause the stylus to vibrate, and the stylus vibrations cause the transducer to deliver an electric current having essentially the same waveform as the groove variations.

The response-frequency characteristic of a phonograph pickup (i. e. the response of the pickup at different frequencies) usually is ascertained by measuring the electrical output of the pickup while playing a standard tone record. This method has value in that it gives an "integrated" measure of the performance of the record-pickup-tone arm system as a whole under actual playing conditions. It has a disadvantage for laboratory investigations of the various stypes of distortion present in reproduced sound in that the distortions contributed by the individual components of the playback system cannot be readily isolated. For example, one can never be quite sure how much of the observed nonlinear distortion is present in the modulated groove, how much is due to improper stylus tracking or motion (due to compliance) of the groove walls, and how much is generated in the transducer. A further disadvantage is the frequent presence of a relatively high noise background which obscures certain phenomena under study, particularly at the extremities of the frequency range of interest.

Measurements made with tone records also are restricted to the amplitudes and frequencies available on the records, although the frequency range may be extended by changing the record turntable speed. Moreover, high-quality records of frequencies below 50 cycles per second (hereinafter abbreviated C. P. S.) and above 10,000 C. P. S. are not readily available. Finally, undesirable variations in turntable speed add to the difficulties of distortion measurements.

It is a general object of the invention to provide an improved apparatus for determining the operating characteristics of phonograph pickups. More specifically, it is an object of the invention to provide testing apparatus including means to drive a phonograph pickup with an adjustable and accurately known amplitude of motion throughout a wide frequency range, while maintaining low distortion, low noise level, and minimum undesirable variations in frequency. In addition to its function as a pickup calibrator, the apparatus described herein is adapted for use in the study of tone-arm resonance and the mechanical properties of record materials, as well as for the measurement of stylus-arm compliance.

In accordance with the invention, the foregoing and other related objects and advantages are attained through the provision of an electromechanical transducer employing a dynamic drive for actuating the stylus of a pickup. The transducer is energized from a variable frequency signal source. Feedback is provided from the transducer to a driving amplifier connecting the transducer to the signal source. The feedback provides sufficient degeneration to reduce the motion of the armature at its mechanical resonance and provide a substantially uniform armature velocity vs. frequency characteristic for the transducer. Means are provided both for measuring the pickup output and for correlating the electrical output of the pickup with the motion of the driving mechanism.

Figure 5:
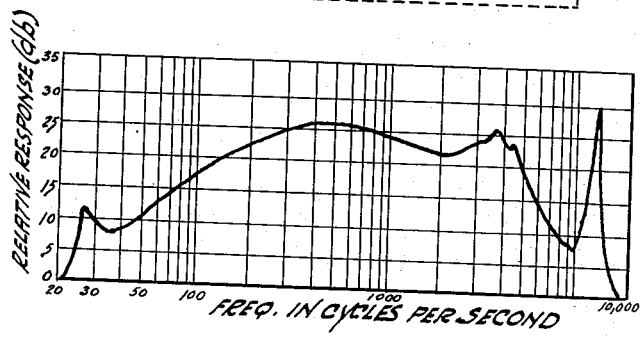
Figure 6:
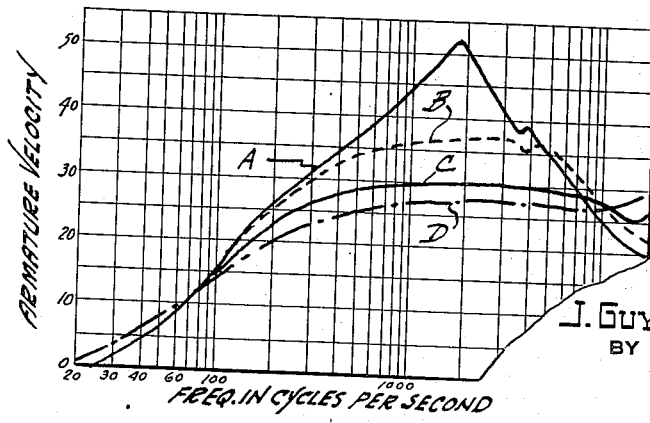

A more complete understanding of the invention can be had by reference to the following description of an illustrative embodiment thereof, when considered in connection with the accompanying drawing, wherein:

Fig. 1 is a block diagram of a phonograph pickup testing apparatus embodying the principles of the invention, Fig. 2 is a cross-sectional view of a preferred form of transducer for use in the system of Fig. 1, Fig. 3 is a plan view of part of the transducer of Fig. 2, Fig. 4 is a schematic diagram showing the electrical connections for the apparatus of Fig. 1, Fig. 5 is a graph showing the results obtained in testing a phonograph pickup with apparatus of the type described herein, Fig. 6 is a graph showing the effect of various amounts of feedback on the transducer armature velocity, and Fig. 7 is a cross-sectional view of the central portion of a modified form of transducer.

In Fig. 1 of the drawing, a phonograph pickup testing apparatus embodying the principles of the invention is shown in block form. The apparatus comprises a variable frequency signal generator 10 of any desired type, adapted to provide oscillatory signals at frequencies within the frequency band of interest for the pickup being tested. For example, the generator 10 may be adapted to provide signals at any frequency within the band from 20 to 20,000 C. P. S.

Signals at a selected frequency from the generator 10 will pass through an amplifier 12 to an electromechanical transducer 14. Details of a preferred type of amplifier and transducer are given hereinafter.

The transducer 14 includes a vibratory member (not shown in Fig. 1) on which rests the stylus 16 of a phonograph pickup 18 to be tested. As the vibratory member in the transducer 14 is set in motion by signals from the generator 10, the stylus 16 will vibrate therewith, causing an electrical signal to be generated by the pickup 18 being tested. A measuring device 20, such as a meter, an oscilloscope or the like, is connected to the pickup 18 to measure the amplitude of the electrical signal generated therein by vibration of the stylus 16.

Since the mechanical system of the transducer 14 ordinarily will have one or more natural resonance frequencies, the response of the transducer will not be a simple function of the amplitude of the electrical driving signal. Feedback is provided through a path 22 from the transducer 14 to the amplifier 12, to make the transducer response substantially uniform. Details of the manner of generating the feedback signal are given hereinafter. While mechanical damping might also be utilized to obtain the desired uniform frequency response in the transducer 14, this expedient generally is unsatisfactory, both because of excessively large power requirements and because available damping materials frequently change in characteristics with age and temperature. Furthermore, for accurate results, it is very helpful to have means for correlating the pickup output with the motion of the vibrating element in the transducer. With an electrical feedback system as in Fig. 1, this correlation can be obtained by connecting a measuring device 24 to the feedback path 22 to measure the feedback signal. The measured feedback signal, being a function of the transducer vibrator motion, can be compared with the pickup output, as measured by the device 20, to obtain the correlation mentioned above.

Turning now to a consideration of the details of the apparatus shown in Fig. 1, in Figs. 2 and 3 there is shown a preferred form of transducer corresponding to the transducer 14 of Fig. 1.

The transducer shown in Figs. 2 and 3 comprises a base plate 30 having a pair of identical spaced apart magnetic structures 32, 34 mounted thereon to define a pair of separate magnetic circuits. Each of the structures 32, 34 comprises a tapered magnet 36 having an inner pole piece 38 at the narrow end thereof. The inner pole piece 38 extends into a central opening in an outer annular pole piece 40 to form an annular air gap 42 between the pole pieces 38, 40. As best shown in Fig. 3, the magnetic return path for each of the structures 32, 34 is through the outer pole piece 40 and a yoke 44 to which the outer pole piece 40 is secured. These structures 32, 34 also provide support for the vibratory system of the transducer.

The movable element for transmitting vibratory motion to the pickup being tested comprises a tubular member 46 which extends into the annular air gaps 42 and is supported near each end by circular plates 48. The plates 48 are clamped at their outer edges to the outer pole pieces 40 and are fastened to the member 46 by any suitable means, such as thermosetting cement. A driving coil 50 and pickup coil 52 are wound on the member 46 at opposite ends thereof within the air gaps defined by the pole pieces 38, 40. Thus, the coils 50, 52 will be inductively coupled to the magnetic circuits defined by the structures 32, 34 so that the tubular member 46 will serve as an armature.

At the center of the armature 46, there is provided a platen 54 on which the stylus of a phonograph pickup can be placed for testing purposes. A suitable platen for this purpose comprises a piece cut from an ordinary phonograph record and wedged or cemented in a slot 56 milled across one side of the armature 46 midway between the ends thereof. The grooves in the piece of phonograph record used as a platen are arranged perpendicular to the direction of armature motion and serve to give the pickup stylus tip a proper bearing. As is explained hereinafter, compliance characteristics of different record materials can be studied by wedging in the slot 56 pieces of records made of these materials.

While the dimensional details of the structure shown in Figs. 2 and 3 may vary considerably, the following details of one transducer used in testing apparatus of the type being described serve to emphasize the various design factors which should be considered.

In order to accommodate all phonograph pickups of reasonable size, a space of about 1⅛ inch is required above the armature 46. When additional space is allowed for clamping the armature supports 48, a lower limit of about 1½ inch is required for the length of the armature tube, exclusive of driver and feedback coils.

If the testing device is to be portable, as is preferable, it is important that the armature 46 and its supports 48 be comparatively rugged. In this connection, it is important also that the moving system be relatively massive so that its response will not be affected appreciably by the mechanical loading of a pickup being tested. While it might seem that the use of feedback would automatically compensate for such loading, the compensation provided by the feedback will be effective primarily as regards amplitude of armature motion. That is, the use of feedback does not preclude the possibility of mechanical coupling between the pickup and the transducer introducing a phase shift of such a value as to make the system unstable with feedback. Consequently, the effect of pickup loading should be kept small. It has been found that a suitable armature tube 46 may be made of dural material, and may have a wall thickness of 0.030 inch. Complementary supporting plates 48 also may be of dural material 0.010 inch thick and with a diameter of 1 inch at the clamped peripheries thereof.

The major factor determining the armature diameter is the magnetic structure of the driver section 32. If the diameter of the armature is too small, the center pole piece 38 will reach magnetic saturation before the field in the air gap 42 is large enough to provide sufficient driving force. If the diameter is too large, the magnets required become unduly bulky. A satisfactory comprise has been found in making the outside diameter of the armature tube about 0.625 inch.

The annular air gaps 42 in which the driver and feedback coils are centered may have an inner diameter of 0.553 inch, an outer diameter of 0.670 inch, and may be 0.125 inch wide. Such gaps will accommodate a driver coil of 115 turns of No. 42 wire in 14 layers. A satisfactory flux density in the air gaps is of the order of 12.5 kilogausses.

When the transducer of Figs. 2 and 3 is being operated, alternating current applied to the driver coil 50 will cause the armature 46 to move longitudinally as indicated by the arrow in Fig. 2. The frequency of vibration of the armature will, of course, be determined by the frequency of the applied driving current. Motion of the armature 46 will cause voltage to be induced in the feedback coil 52, and this voltage will be proportional in amplitude and equal in frequency to the motion of the armature. The manner in which the feedback voltage is utilized will be explained hereinafter.

Turning next to a consideration of the electrical characteristics of the apparatus of Figure 1, in Figure 4 there is shown the circuit diagram of a preferred form of amplifier corresponding to the amplifier 12 of Fig. 1, together with the details of the manner in which electrical feedback can be utilized in the system.

In the circuit of Figure 4, the signal generator 10 is connected to the input circuit of a first amplifier tube 60, while the feedback coil 52 of the transducer 14 (not shown in Fig. 4) is connected to the input circuit of a second amplifier tube 62. The input circuit of the first amplifier tube 60 may include a potentiometer 64 for adjusting the amplitude of the signal voltage from the source 10. The input circuit of the feedback amplifier 62 may include a similar potentiometer 66, and an R–C compensation network 68 to improve the high-frequency stability of the system. That is, as the frequency increases, the phase and amplitude characteristics of the feedback signal generating circuit may tend to cause the system to oscillate. This tendency can be reduced by using an R–C compensating network to alter the transmission characteristics of the feedback circuit in a desired manner. It will be understood that feedback instability is a function both of phase angle and of gain, so that compensation sometimes can be achieved by a phase angle change even though accompanied by an increase in gain.

By adjusting the feedback control potentiometer 66, all or part of the feedback voltage can be eliminated to obtain armature velocities in excess of one centimeter per second in the neighborhood of mechanical resonance. As explained hereinafter, a maximum velocity of about one centimeter per second is normal when maximum feedback is employed.

The output circuits of the signal and feedback amplifiers 60, 62 are coupled together through a pair of isolating resistors 70 to provide at the input of a third amplifier tube 72 a voltage proportional to the difference between the driving signal from the source 10 and the feedback voltage from the coil 52. It will, of course, be understood that the feedback coil 52 should be properly connected to the feedback amplifier 62 so that the signal and feedback voltages will be in out-of-phase relation to each other at the frequency of the primary mechanical resonance.

The output circuit of the amplifier 60 includes an R–C compensation network 65 which causes the armature velocity vs. frequency characteristic to approximate the standard phonograph recording characteristic when the feedback control 66 in at its maximum setting. As will be familiar to those skilled in the art, the standard phonograph recording characteristic requires constant amplitude of armature motion below 500 C. P. S. and constant armature velocity above 500 C. P. S.

The third amplifier tube 72 is connected to provide input voltage to one tube 74 in a push-pull network 76, 74. The other tube 76 in the push-pull network receives input voltage from the third amplifier tube 72 through a phase inverter 78.

The output circuit of the push-pull network, 74, 76, includes a coupling transformer 80 which is connected to the driver coil 50. The circuit of Fig. 4 also includes a conventional rectifier power supply system 82 for energizing the tubes 60, 62, 72, 74, 76, 78. It is believed that the functions of the elements in the power supply 82 will be understood without detailed explanation thereof.

The power output requirement for the amplifier of Fig. 4 can be estimated from the parameters of the mechanical system and the driving coil, and the type of response required. It can be shown that at 10,000 C. P. S. a current of about 0.7 ampere will drive a 7 gram armature at a velocity of 1 cm./sec. With a D. C. resistance of 8 ohms in the driver coil 50, this corresponds to a dissipation of about 3 watts at this level. However, the driver coil presents an inductive load to the amplifier which, at the higher frequencies, may be 3 or 4 times as great as the D. C. resistance. Consequently, as many as 12 volt-amperes may be required for 1 cm./sec. velocity at high frequencies. The output stage of the amplifier should be capable of delivering power approximately equal to this even though the actual dissipation is considerably less. Higher velocities require excessive amounts of power, and may not be of sufficient importance to justify the expense of making provision therefor. The 12-watt power requirement is easily met with a pair of type 6L6 tubes in the push-pull circuit 74, 76.

The mechanical driving force of the armature 46 will be proportional to the current in the driver coil. To assist in keeping the driving force constant for all frequencies it is deemed advisable to use a small amount of current feedback (say about 7 decibels). This may be done by developing a voltage proportional to driver current across a small resistor 84 connected in series with the driver coil 50. This feedback voltage can be supplied to the cathode circuit of the third amplifier 72.

As with most feedback systems, the use of unduly large amounts of feedback sometimes results in oscillation at high frequencies. This tendency to oscillate can be reduced considerably by applying mechanical damping to the armature. This damping may take the form of viscoloid strips (not shown) cemented to the armature tube 46. For example, for the armature dimensions previously given, viscoloid strips ⅛ inch square and 1½ inches long have been found suitable. The damping may also reduce the magnitude of the principal resonance, but this is an unimportant result since the feedback will hold complete control in that frequency region. The tendency for oscillation at high frequencies can be made negligible for normal conditions by reducing the feedback to a reasonable value and inserting proper high-frequency compensation in the feedback loop.

It has been found that the tendency for high frequency oscillations will be enhanced when the armature becomes overheated, as by passing excessively large currents through the driver coil 50 for an extended period. This enhancement is probably jointly due to alteration in mechanical constraints as the metal parts expand and to decreased damping as the viscoloid becomes softened. Again, this offers no problem under normal operating conditions.

Oscillations can be made to occur at almost any frequency within the range of interest, say between 8000 and 20,000 C. P. S., by an improper choice of compensation. The system is made more susceptible to oscillations in this range by overheating of the armature. However, no difficulty has been experienced in this frequency range unless deliberately provoked by a change of circuit elements. No problem of instability has been encountered under any circumstances at frequencies other than those noted above.

The requirement that the response of the calibrator be unaffected by the load imposed by a pickup under test has been met. Under extreme conditions of loading, as by pressing the fingers or other large objects tightly against the armature, the response in certain regions of the audio range may be altered by 0.5 decibel when feedback is used. The smaller amount of loading imposed by a pickup under test results in entirely negligible alterations in response.

Results obtained with apparatus of the type described herein in testing a phonograph pickup are shown in Fig. 5, wherein relatively pickup response is plotted in decibels as the ordinate, against frequency in C. P. S. as the abscissa, the latter being on a logarithmic scale. The curve of Fig. 5 was made with the feedback control 66 at its maximum setting to give the standard recording velocity characteristic. The pickup was connected to a ½ megohm load through a 0.01 mfd. series capacitor, and the curve was made with automatic curve-tracing equipment. The pickup cartridge being tested was mounted on a special tone arm with an easily adjustable counterweight. The stylus-arm resonance above 10,000 C. P. S. as well as the tone-arm resonance below 100 C. P. S. is quite evident in the curve.

Absolute values of pickup sensitivities are obtained by measuring at the same frequency the voltages generated by the feedback coil 52 and by the pickup being tested. For example, in the case of one pickup, at 500 C. P. S. the generated feedback E. M. F. was 0.0275 volt when the output of the pickup was 0.00617 volt. The armature velocity corresponding to 0.0275 volt was calculated to be 0.164 cm./sec. for the calibrator being used. Hence, the output of the pickup at 500 C. P. S. for 1 cm./sec. R. M. S. stylus velocity is 0.00617/0.164=0.0377 volt. The R. M. S. amplitude of motion of 0.164/500=0.000328 cm.=0.000130 inch.

The output of the pickup at 500 C. P. S. for 0.001 inch R. M. S. amplitude is 0.00617/0.130=0.0475 volt. Values at other frequencies can be computed by referring to the response curve for the pickup in question and to the armature volocity response curve with maximum feedback. Such a curve (armature velocity response) for a typical system of the type herein described is shown as curve D in Fig. 6, wherein armature velocity is plotted as the ordinate, against frequency as the abscissa, for varying amounts of feedback and with constant voltage input to the amplifier. In Fig. 6, curve A represents the velocity response with no feedback, and curves B and C illustrate the effects of intermediate amounts of feedback.

The transducer shown in Figs. 2 and 3 can be used to best advantage with non-magnetic pickups, such as so-called crystal pickups. The proximity of the pickup to the driver coil usually results in an induced voltage being generated with magnetic pickups. However, as shown in Fig. 7, inductive coupling between the driver coil 50 and the pickup being tested can be materially reduced by using shielding to cut down the lines of force which otherwise would pass through the clamping plate 48 and armature tube 46. In the modification of Fig. 7, copper discs 90 are mounted adjacent to the supporting plates 48 in the space between the plates 48 and spaced therefrom by shoulders 92, while copper slugs 94 are mounted on the inner pole pieces 38 to extend within the tube 46. Actually, shielding is effective primarily at the driver coil end of the tube 46, but preferably is used at both ends for the sake of symmetry.

The response of a pickup is but little altered by using different materials for the calibrator platen except in the neighborhood of the low frequency at which the lateral stylus-arm compliance resonates with the effective mass of the tone-arm and pickup; that is, near the so-called tone-arm resonance. At the frequency of this resonance, the compliance of the stylus arm and the effective mass of the tone arm and pickup cartridge form a parallel tuned circuit, so that the stylus presents a high impedance to the driving force. Any compliance in the platen material is in parallel with the stylus arm compliance and lowers the resonant frequency. Thus, any change in the compliance of the platen material will alter the frequency at which the tone-arm resonance occurs. It follows, then, that by using the same pickup, and measuring the frequencies at which tone arm resonances occur for different platen materials, a relative measure of the dynamic compliances of the platen material can be obtained. Similarly, substitution of different tone arms or other elements of the phonograph pickup assembly will permit determination of the resonance characteristics of such elements.

It can be seen that the calibrator described herein provides a simple and highly accurate device for testing electric phonograph pickups and for measuring certain characteristics of record materials. Since many changes could be made in the specific apparatus shown and described, all within the scope and spirit of the invention, the foregoing is to be construed as illustrative, and not in a limiting sense.

What is claimed is:

1. In an apparatus for testing an electric phonograph pickup of the type comprising means including a stylus adapted to ride in the modulated groove of a phonograph record for generating electrical signals in response to vibratory motion of said stylus, in combination, an electromechanical transducer including a vibratory member adapted to vibrate in response to and at a frequency determined by the frequency of electrical signals applied to said transducer, means on said vibratory element on which to rest said stylus to vibrate said stylus with said vibratory element, measuring means connected to said signal generating means of said pickup for measuring the electrical signal generated by vibration of said stylus, feedback signal generating means coupled to said vibratory element and responsive to vibratory motion of said element for generating an electrical signal representative of said vibratory motion and including measuring means connected to measure the signal generated by said last-named signal generating means.

2. Apparatus for testing a phonograph pickup of the type comprising means including a stylus for generating an electrical signal in response to vibratory motion of said stylus, said apparatus comprising an electromechanical transducer including a vibratory member, means on said member providing a bearing surface on which to rest the stylus of a phonograph pickup being tested, means including a driving coil on said vibratory member for imparting vibratory motion to said member in response to an electrical signal applied to said coil, means including a second coil on said vibratory member for generating in response to vibratory motion of said member an electrical signal representative of said motion, and measuring means connected to said second coil to measure the signal generated in said second coil.

3. Apparatus for testing a phonograph pickup of the type comprising means including a stylus for generating an electrical signal in response to vibratory motion of said stylus, said apparatus comprising a variable frequency signal source, an electromechanical transducer including a vibratory member, means on said member providing a bearing surface on which to rest the stylus of a pickup being tested, means including a driving coil on said vibratory member for imparting vibratory motion to said member in response to an electrical signal applied to said coil, means including a second coil on said vibratory member for generating in response to vibratory motion of said member an electrical signal representative of said motion, an amplifier having an output section connected to said driving coil, a circuit connecting said second coil to said input section of said amplifier, and measuring means adapted to be connected to said pickup being tested to measure the signal generated therein.

4. Apparatus for testing a phonograph pickup of the type comprising means including a stylus for generating an electrical signal in response to vibratory motion of said stylus, said apparatus comprising a variable frequency signal source, an electromechanical transducer including a vibratory member, means on said member providing a bearing surface on which to rest the stylus of a phonograph pickup being tested, means including a driving coil on said vibratory member for imparting vibratory motion to said member in response to an electrical signal applied to said coil, means including a second coil on said vibratory member for generating in response to vibratory motion of said member an electrical signal representative of said motion, an amplifier having an input section connected to said signal source and an output section connected to said driving coil, a circuit connecting said second coil to said input section of said amplifier, measuring means connected to said circuit to measure the signal generated in said second coil, and measuring means connected to said pickup being tested to measure the signal generated therein for comparison with the signal generated in said second coil.

5. Apparatus for testing a phonograph pickup of the type comprising means including a stylus for generating an electrical signal in response to vibratory motion of said stylus, said apparatus comprising an electromechanical transducer including a vibratory member, means on said member providing a bearing surface on which to rest the stylus of a pickup being tested, means including a driving coil on said vibratory member for imparting vibratory motion to said member in response to an electrical signal applied to said coil, means including a second coil on said vibratory member for generating in response to vibratory motion of said member an electrical signal representative of said motion, means including an amplifier for supplying a driving signal to said driving coil, a circuit connecting said second coil to the input section of said amplifier, and measuring means adapted to be connected to said pickup being tested to measure the signal generated therein.

6. An apparatus as defined in claim 1 including an amplifier having an output circuit connected to said transducer and having an input circuit adapted to be connected to a signal source, and degenerative feedback connections from said last-named signal generating means to said input circuit.

7. An apparatus as defined in claim 2 including in said feedback connections a resistance-capacitance compensating network for reducing the tendency for oscillation of the system.

8. An apparatus as defined in claim 2 including means to adjust the amplitude of the feedback signal applied to said input circuit through said feedback connections.

9. An electromechanical transducer for testing a phonograph pickup, said transducer comprising a pair of magnetic structures spaced apart a sufficient distance to have interposed therebetween and at right angles therewith the stylus-support of a phonograph pickup to be tested, each said structure including a magnet, inner and outer pole pieces associated with each said magnet and defining a pair of concentric annular air gaps in spaced relation, an elongated tubular member movably attached to said structure and having open ends extending into said air gaps, a pair of coils wound one on each of said ends on the portions thereof which extend into said air gaps, and means on said tubular member intermediate said ends providing a bearing surface on which to rest the stylus of a phonograph pickup to be tested to impart motion to said stylus in response to motion of said tubular member.

10. A transducer as defined in claim 9 wherein said last named means comprises a piece of grooved phonograph record, the piece being mounted so that the grooves therein are at right angles to the direction of motion of said member.

11. An electromechanical transducer for testing a phonograph pickup, said transducer comprising two separate magnetic structures defining two magnetic circuits including a pair of spaced air gaps, a vibrating system comprising an elongated member supported on said structure and having opposite ends extending into said gaps, a coil wound on each said end and each in inductive relation with the magnetic circuit of the gap in which each coil is disposed, one of said coils constituting a driving coil for setting said vibrating system into vibratory motion upon application of an electrical signal to said one coil and the other of said coils constituting a pickup coil for generating an electrical signal representative of the motion of said system, and means intermediate the ends of said elongated member providing a bearing surface on which to rest the stylus of said phonograph pickup to be tested.

12. A transducer as defined in claim 11 including supporting means comprising a pair of circular plates movably connecting said tubular member to said outer pole pieces.

13. A transducer as defined in claim 12 including a shielding member adjacent one of said plates for reducing the magnetic field in the space between said plates.

14. In an apparatus for testing an electric phonograph pickup of the type including a stylus adapted to ride in the modulated groove of a phonograph record, in combination, an electromechanical transducer including a vibratory element adapted to vibrate in response to electrical signals applied to said transducer, said transducer also including signal generating means coupled to said vibratory element and adapted to generate an electric signal of frequency and amplitude proportional to the frequency and amplitude of motion of said vibratory element, a platen on said vibratory element on which to rest the stylus of a phonograph pickup to be tested, and measuring means coupled to said signal generating means to measure the signal generated by said signal generating means.

15. In a testing apparatus, an electromechanical transducer comprising a pair of magnetic structures spaced apart a sufficient distance to have interposed therebetween and at right angles therewith the stylus-support of a phonograph pickup, each said structure including a magnet, inner and outer pole pieces associated with each said magnet and defining a pair of concentric annular air gaps in spaced relation, an elongated tubular member movably attached to said structure and having open ends extending into said air gaps, a pair of coils wound one on each of said ends on the portions thereof which extend into said air gaps, and means to mount on said tubular member intermediate said ends a platen to provide a bearing surface on which to rest the stylus of a phonograph pickup to impart motion to said stylus in response to motion of said tubular member.

J GUY WOODWARD.

References Cited in the file of this patent

UNITED STATES PATENTS

| Number | Name | Date |
|---|---|---|
| 1,426,743 | Kaehni | Aug. 22, 1922 |
| 1,571,050 | Gerns | Jan. 26, 1926 |
| 2,394,613 | Houlgate | Feb. 12, 1946 |